US011662976B2

(12) United States Patent
Cho et al.

(10) Patent No.: US 11,662,976 B2
(45) Date of Patent: May 30, 2023

(54) ELECTRONIC DEVICE AND METHOD FOR SHARING VOICE COMMAND THEREOF

(71) Applicant: Samsung Electronics Co., Ltd., Gyeonggi-do (KR)

(72) Inventors: Jungkeun Cho, Gyeonggi-do (KR); Bokyum Kim, Gyeonggi-do (KR); Jaeyung Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 205 days.

(21) Appl. No.: 17/022,566

(22) Filed: Sep. 16, 2020

(65) Prior Publication Data
US 2021/0117151 A1 Apr. 22, 2021
US 2021/0117151 A1 Apr. 22, 2021

(30) Foreign Application Priority Data

Oct. 16, 2019 (KR) .................. 10-2019-0128741

(51) Int. Cl.
*G10L 15/00* (2013.01)
*G06F 3/16* (2006.01)
(Continued)

(52) U.S. Cl.
CPC .............. *G06F 3/167* (2013.01); *G06F 9/453* (2018.02); *G06F 9/547* (2013.01); *G10L 15/22* (2013.01); *G10L 15/30* (2013.01); *G10L 15/063* (2013.01); *G10L 15/08* (2013.01); *G10L 2015/228* (2013.01)

(58) Field of Classification Search
CPC combination set(s) only.
See application file for complete search history.

(56) References Cited

U.S. PATENT DOCUMENTS 9,699,161 B2 7/2017 Ducker et al.
9,786,296 B2 10/2017 Kim et al.
(Continued)

FOREIGN PATENT DOCUMENTS

JP 2016-114744 6/2016
KR 1020170086814 7/2017
(Continued)

OTHER PUBLICATIONS

International Search Report dated Dec. 21, 2020 issued in counterpart application No. PCT/KR2020/012392, 3 pages.

*Primary Examiner* — Vu B Hang
(74) *Attorney, Agent, or Firm* — The Farrell Law Firm, P.C.

(57) ABSTRACT

An electronic device is provided and includes a display; a wireless communication circuit; a processor operatively connected to the display and the wireless communication circuit; and a memory operatively connected to the processor. The memory may store instructions that, when executed, cause the processor to obtain a command generated by an utterance input on an external device, and first data related to a function to be executed when the command is input on the external device by using the wireless communication circuit; obtain second data related to a function to be executed when the command is input on the electronic device; and determine whether the command is executable on the electronic device based on a result of a comparison between the first data and the second data.

18 Claims, 13 Drawing Sheets

(51) Int. Cl.
*G10L 15/22* (2006.01)
*G06F 9/54* (2006.01)
*G06F 9/451* (2018.01)
*G10L 15/30* (2013.01)
G10L 15/08 (2006.01)
G10L 15/06 (2013.01)

(56) References Cited

U.S. PATENT DOCUMENTS

| | | |
|---|---|---|
| 10,068,028 B1 | 9/2018 | Hendriks |
| 10,096,316 B2 * | 10/2018 | Kalns ................... G10L 15/18 |
| 10,283,116 B2 | 5/2019 | Ko et al. |
| 10,685,187 B2 * | 6/2020 | Badr .................... G06F 9/468 |
| 2004/0030560 A1 | 2/2004 | Takami et al. |
| 2019/0044745 A1 | 2/2019 | Knudson et al. |
| 2019/0287525 A1 | 9/2019 | Kim et al. |

FOREIGN PATENT DOCUMENTS

| | | |
|---|---|---|
| KR | 1020170126645 | 11/2017 |
| KR | 1020190109868 | 9/2019 |

\* cited by examiner

ELECTRONIC DEVICE AND METHOD FOR SHARING VOICE COMMAND THEREOF

CROSS-REFERENCE TO RELATED APPLICATION(S)

This application is based on and claims priority under 35 U.S.C. § 119 to Korean Patent Application No. 10-2019-0128741, filed on Oct. 16, 2019, in the Korean Intellectual Property Office, the disclosure of which is incorporated by reference herein in its entirety.

BACKGROUND

1. Field

The disclosure relates generally to an electronic device and, more particularly, to an electronic device capable of receiving a user's voice input and executing a function corresponding to a command generated from the voice input, and a method for sharing a voice command thereof.

2. Description of Related Art

With advances in mobile communication technology and processor technology, portable terminal devices (hereinafter, referred to as electronic devices) have been able to support various functions in addition to conventional call-related functions. Electronic devices provide various user interfaces to enable users to readily utilize these various functions.

The user interface of an electronic device may support not only touch input functions based on buttons or a touchscreen but also more advanced voice input functions. For example, an electronic device equipped with a microphone may receive a voice input from the user and perform a function corresponding to the voice input through speech recognition and natural language processing.

The user of a first electronic device supporting a voice input function may want to share a voice input with the user of a second electronic device or share a voice input used by the user of the second electronic device.

SUMMARY

The present disclosure has been made to address the above-mentioned problems and disadvantages, and to provide at least the advantages described below.

In accordance with an aspect of the disclosure, an electronic device includes a display; a wireless communication circuit; a processor operatively connected to the display and the wireless communication circuit; and a memory operatively connected to the processor. The memory may store instructions that, when executed, cause the processor to obtain a command generated by an utterance input on an external device, and first data related to a function to be executed when the command is input on the external device by using the wireless communication circuit; obtain second data related to a function to be executed when the command is input on the electronic device; and determine whether the command is executable on the electronic device based on a result of a comparison between the first data and the second data.

In accordance with another aspect of the disclosure, a method for an electronic device to share commands includes obtaining a command generated by an utterance input on an external device, and first data related to a function to be executed when the command is input on the external device; obtaining second data related to a function to be executed when the command is input on the electronic device; and determining whether the command is executable on the electronic device based on a result of a comparison between the first data and the second data.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Various embodiments of the disclosure provide an electronic device and a method for sharing a voice command. The electronic device may share a command generated from a voice input of the user with another electronic device, verify a command obtained based on information owned by the electronic device and convert the verified command to suit the electronic device.

According to various embodiments of the disclosure, an electronic device and a method for sharing a voice command are provided. The method enables the electronic device to not only share a command generated from a voice input of the user with another electronic device, but also verify a command obtained by sharing information with the another electronic device based on information owned by the electronic device and convert the verified command to suit the electronic device.

Figure 1:
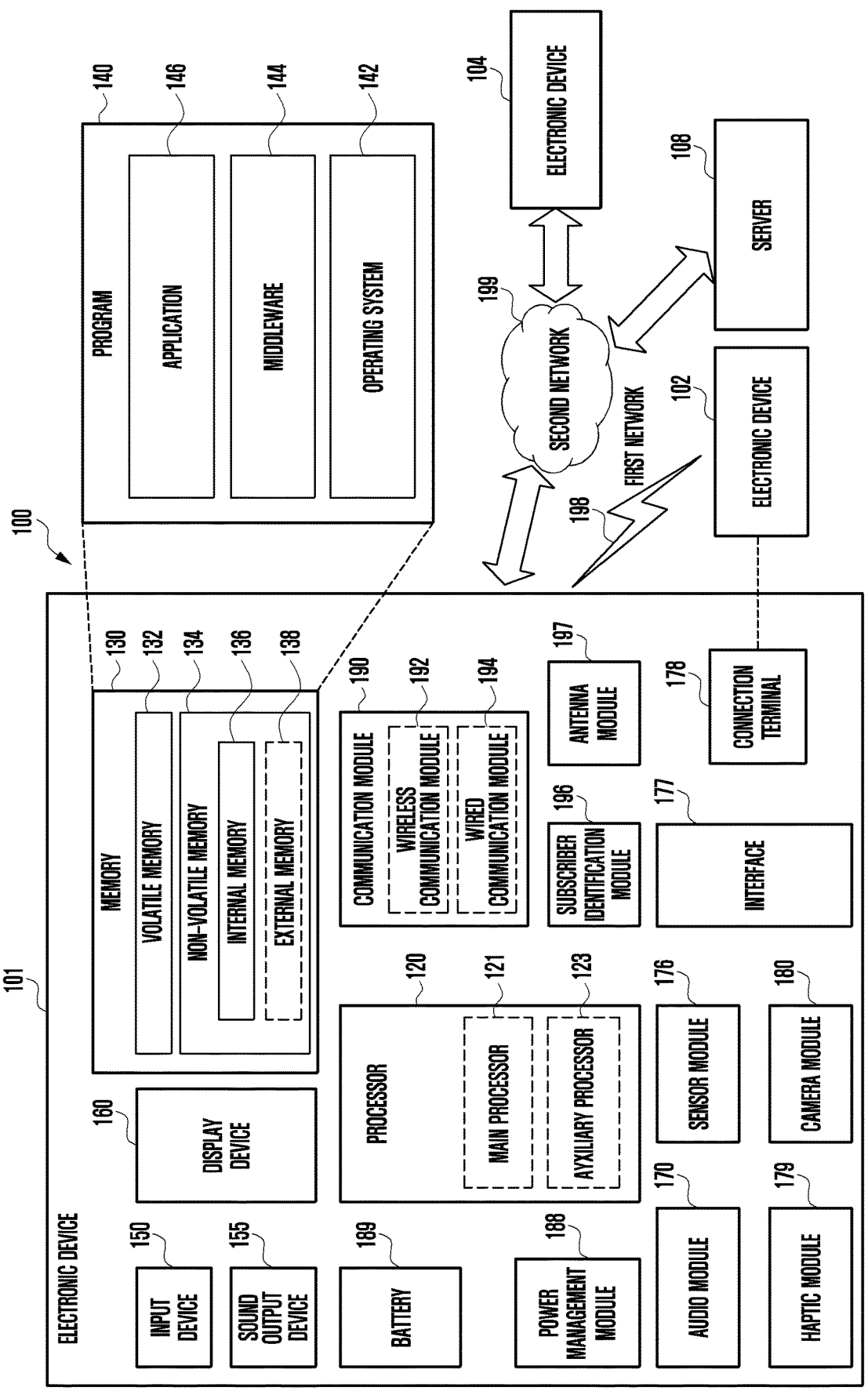
FIG. 1 is a block diagram of an electronic device in a network, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
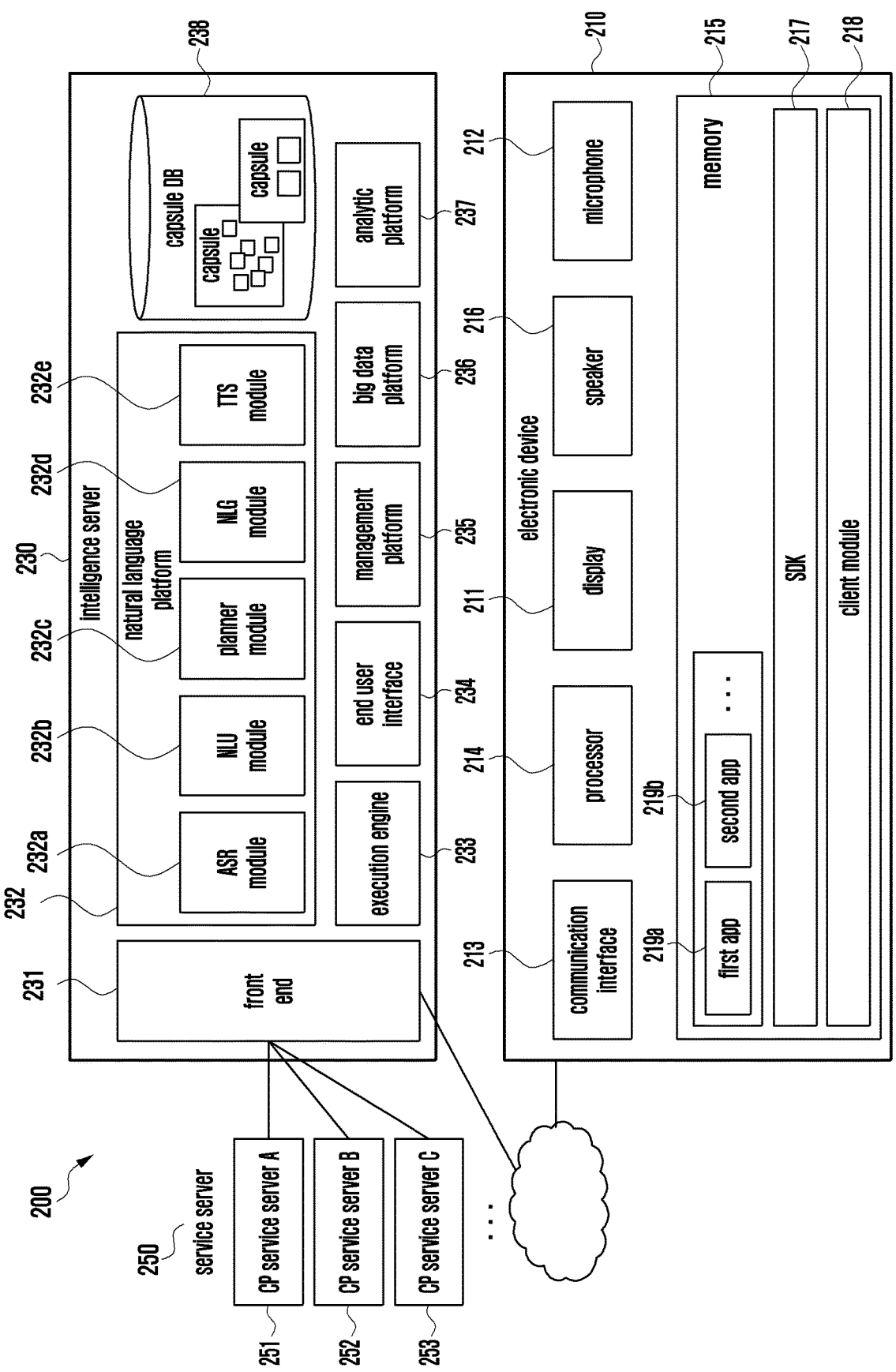
FIG. 2 is a block diagram of an integrated intelligence system, according to an embodiment.

FIG. 2 is a block diagram of an integrated intelligence system, according to an embodiment.

With reference to FIG. 2, the integrated intelligent system includes a user terminal 210, an intelligent server 230, and a service server 250.

The user terminal 210 may be a terminal device (or an electronic device) connectable to the Internet, such as a mobile phone, a smartphone, a personal digital assistant (PDA), a notebook computer, a television (TV), a white home appliance, a wearable device, a head mounted display (HMD), or a smart speaker.

The user terminal 210 may include a communication interface 213, a microphone 212, a speaker 216, a display 211, a memory 215, or a processor 214. The components listed above can be operatively or electrically connected to each other. The user terminal 210 may include at least a part of the configuration and/or function of the electronic device 100 in FIG. 1.

The communication interface 213 may be configured to be connected to an external device for transmitting and receiving data. The microphone 212 may receive a sound (e.g., a user utterance) and convert it into an electrical signal. The speaker 216 may output a sound (e.g., voice) corresponding to an electrical signal. The display 211 may be configured to display an image or video. The display 211 may also display a graphical user interface (GUI) of an app (or application program) being executed.

The memory 215 may store a client module 218, a software development kit (SDK) 217, and a plurality of apps 219a and 219b. The client module 218 and the SDK 217 may constitute a framework (or a solution program) for performing general-purpose functions. The client module 218 or the SDK 217 may also constitute a framework for processing a voice input.

The plurality of apps 219a and 219b stored in the memory 215 may be programs for performing a designated function. The plurality of apps may include a first app 219a and a second app 219b. Each of the plurality of apps 219a and 219b may include a plurality of actions for performing a designated function. For example, the plurality of apps 219a and 219b may include an alarm app, a message app, and/or a schedule app. When the plurality of apps 219a and 219b are executed, the processor 214 may sequentially execute at least some of the plurality of actions.

The processor 214 may control the overall operation of the user terminal 210. The processor 214 may be electrically connected to the communication interface 213, the microphone 212, the speaker 216, and the display 211 and may perform a designated operation.

The processor 214 may also execute a program stored in the memory 215 to perform a designated function. For example, the processor 214 may execute at least one of the client module 218 or the SDK 217 to perform the following actions for processing a voice input. The processor 214 may control the actions of the plurality of apps 219a and 219b through the SDK 217. The following operations described as operations of the client module 218 or the SDK 217 may be operations performed through execution of the processor 214.

The client module 218 may receive a voice input. For example, the client module 218 may receive a voice signal corresponding to an utterance of the user sensed by the microphone 212. The client module 218 may transmit the received voice input to the intelligent server 230. The client module 218 may transmit status information of the user terminal 210 to the intelligent server 230 together with the received voice input. The status information may be, for example, information on the execution state of an app.

The client module 218 may receive a result corresponding to the received voice input. When the intelligent server 230 can produce a result corresponding to the received voice input, the client module 218 may receive the result corresponding to the received voice input. The client module 218 may display the received result on the display 211.

The client module 218 may receive a plan corresponding to the received voice input. The client module 218 may display a result of executing a plurality of actions of the app according to the plan on the display 211. For example, the client module 218 may sequentially display execution results of a plurality of actions on the display 211. Additionally or alternatively, the user terminal 210 may display only some of execution results of a plurality of actions (e.g., the result of the last action only).

The client module 218 may receive a request from the intelligent server 230 for information needed to produce a result corresponding to a voice input. In response to the request, the client module 218 may transmit the requested information to the intelligent server 230.

The client module 218 may transmit information on the result of executing a plurality of actions according to the plan to the intelligent server 230. The intelligent server 230 may confirm that the received voice input is correctly processed based on the result information.

The client module 218 may include a speech recognition module. The client module 218 may recognize a voice input for performing a limited function through the speech recognition module. For example, the client module 218 may execute an intelligent app to process a voice input for performing organized actions through a designated input (e.g., a "wake up!" input).

The intelligent server 230 may receive information related to a user voice input from the user terminal 210 through a communication network. The intelligent server 230 may convert the received data related to the voice input into text data. The intelligent server 230 may generate a plan for performing a task corresponding to the user voice input based on the text data.

The plan can be generated by an artificial intelligence (AI) system. The AI system may be a rule-based system, a neural network-based system (e.g., a feedforward neural network (FNN) system or a recurrent neural network (RNN) system), or a combination thereof. Other types of AI systems are also possible. The plan can be selected from a predefined set of plans, or can be generated in real time in response to a user request. For example, the artificial intelligence system may select at least one plan from among a plurality of predefined plans.

The intelligent server 230 may transmit the result according to a generated plan or the generated plan to the user terminal 210. The user terminal 210 may display the result according to the plan on the display 211. The user terminal 210 may display the result of executing actions according to the plan on the display 211.

The intelligent server 230 may include a front end 231, a natural language platform 232, a capsule database 238, an execution engine 233, an end user interface 234, a management platform 235, a big data platform 236, or an analysis platform 237.

The front end 231 may receive a voice input transmitted from the user terminal 210. The front end 231 may transmit a response corresponding to the voice input.

The natural language platform 232 may include an automatic speech recognition (ASR) module 232a, a natural language understanding (NLU) module 232b, a planner module 232c, a natural language generator (NLG) module 232d, or a text to speech (TTS) module 232e.

The automatic speech recognition module 232a may convert the voice input received from the user terminal 210 into text data. The natural language understanding module 232b may identify the user's intention based on the text data of the voice input. For example, the natural language understanding module 232b may identify the user's intention by applying syntactic analysis or semantic analysis. The natural language understanding module 232b may identify the meaning of words extracted from the voice input by using morphemes or linguistic features of phrases (e.g., grammatical elements), and determine the user's intention by matching the identified meaning of the words with intentions.

The planner module 232c may generate a plan by using intentions and parameters determined by the natural language understanding module 232b. The planner module 232c may determine a plurality of domains required to perform a task based on the determined intention. The planner module 232c may determine a plurality of actions included in each of the domains determined based on the intention. The planner module 232c may determine the parameter required to execute the determined plural actions or determine the result value output by executing the plural actions. The parameter and the result value may be defined as a concept of a designated type (or class). Consequently, the plan may include a plurality of actions determined by the user's intention, and a plurality of concepts. The planner module 232c may determine the relationship between plural actions and plural concepts in a stepwise (or hierarchical) manner. For example, the planner module 232c may determine the execution sequence of the plural actions determined based on the user's intention according to the plural concepts. In other words, the planner module 232c may determine the execution sequence of the plural actions based on the parameter required for execution of the plural actions and the result to be output by the execution of the plural actions. Accordingly, the planner module 232c may generate a plan including association information (e.g., ontology information) between plural actions and plural concepts. The planner module 232c may generate a plan by using information stored in a capsule database storing a set of relationship between concepts and actions.

The natural language generation module 232d may convert designated information into a text form. The information converted into a text form may be in the form of a natural language utterance. The text to speech module 232e may convert text-form information into speech-form information.

Some or all of the functions of the natural language platform 232 may also be implemented in the user terminal 210.

The capsule database may store information on the relationship between plural concepts and actions corresponding to plural domains. A capsule may include a plurality of action objects (or action information) and concept objects (or concept information) included in the plan. The capsule database may store a plurality of capsules in the form of a concept action network (CAN). The plurality of capsules may be stored in a function registry included in the capsule database.

The capsule database may include a strategy registry storing strategy information necessary for determining a plan corresponding to a voice input. The strategy information may include reference information for determining one plan when there are multiple plans corresponding to a voice input. The capsule database may include a follow-up registry storing information on follow-up actions for suggesting a follow-up action to the user in a specific situation. The follow-up action may include, for example, a follow-up utterance. The capsule database may include a layout registry storing layout information of the information output through the user terminal 210. The capsule database may include a vocabulary registry storing information on vocabularies included in capsule information. The capsule database may include a dialogue registry storing information on dialogues (or interactions) with the user. The capsule database may update the stored objects through a developer tool. The developer tool may include a function editor for updating, for example, an action object or a concept object. The developer tool may include a vocabulary editor for updating the vocabulary. The developer tool may include a strategy editor to create and register a strategy for determining a plan. The developer tool may include a dialog editor to generate a conversation with the user. The developer tool may include a follow-up editor that can activate a follow-up goal and edit a follow-up utterance providing a hint. The follow-up goal may be determined based on a currently set goal, user preferences, or environmental conditions. The capsule database may also be implemented in the user terminal 210.

The execution engine 233 may produce a result by using the generated plan. The end user interface 234 may transmit the produced result to the user terminal 210. Accordingly, the user terminal 210 may receive the result and provide the received result to the user. The management platform 235 may manage information used in the intelligent server 230. The big data platform 236 may collect user data. The analysis platform 237 may manage the quality of service (QoS) of the intelligent server 230. For example, the analysis platform 237 may manage the components and processing speed (or efficiency) of the intelligent server 230.

The service server 250 may provide a designated service (e.g., a food ordering service or a hotel reservation service) to the user terminal 210. The service server 250 may be a server operated by a third party. The service server 250 may provide the intelligent server 230 with information needed to generate a plan corresponding to a received voice input. The provided information can be stored in the capsule database. In addition, the service server 250 may provide information on the result according to the plan to the intelligent server 230.

In the integrated intelligent system described above, the user terminal 210 may provide various intelligent services to the user in response to a user input. The user input may include, for example, an input through a physical button, a touch input, or a voice input.

The user terminal 210 may provide a speech recognition service through an intelligent app (or, a speech recognition app) installed therein. In this case, for example, the user terminal 210 may recognize an utterance or voice input of the user received through the microphone 212 and provide a service corresponding to the recognized voice input to the user.

Based on the received voice input, the user terminal 210 may perform a designated action by itself or together with the intelligent server 230 and/or the service server 250. For example, the user terminal 210 may execute an app corresponding to a received voice input to perform a designated action through the app.

When the user terminal 210 provides a service together with the intelligent server 230 and/or the service server 250, the user terminal 210 may detect a user's utterance by using the microphone 212, generate a signal (or voice data) corresponding to the detected utterance, and transmit the voice data to the intelligent server 230 through the communication interface 213.

As a response to the voice input received from the user terminal 210, the intelligent server 230 may generate a plan for performing a task corresponding to the voice input or generate a result of performing actions according to the plan. The plan may include, for example, a plurality of actions for performing the task corresponding to the user's voice input, and a plurality of concepts related to the actions. The concept may be defined as a parameter input to the execution of the plurality of actions or as a result value to be output by the execution of the plurality of actions. The plan may include information about the association between the plurality of actions and the plurality of concepts.

The user terminal 210 may receive the response through the communication interface 213. The user terminal 210 may output a voice signal generated in the user terminal 210 to the outside by using the speaker 216, or may output an image generated in the user terminal 210 to the outside by using the display 211.

Figure 3:
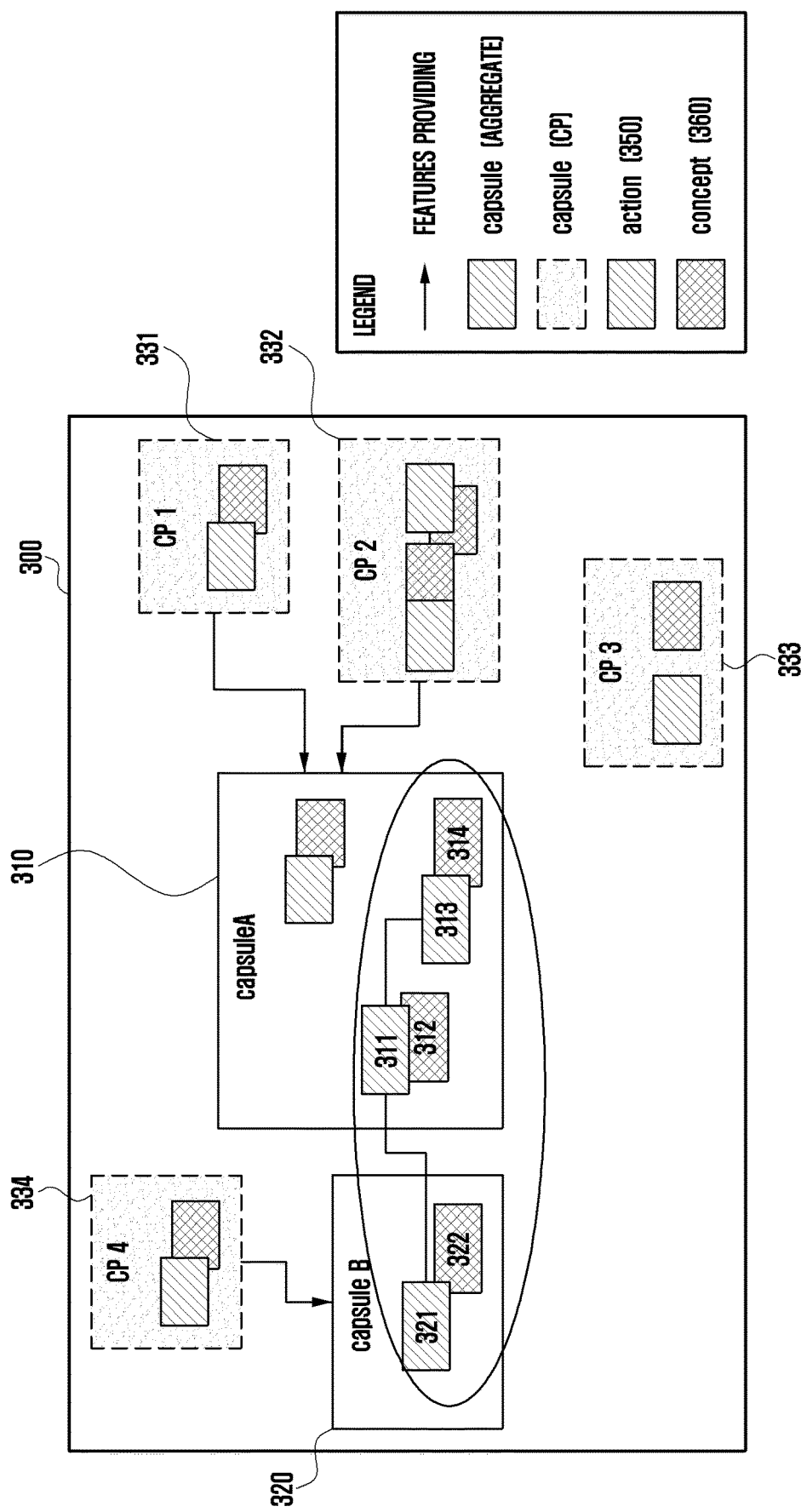
FIG. 3 illustrates a form in which information on the relationship between concepts and actions is stored in a database, according to an embodiment.

FIG. 3 illustrates a form in which information on the relationship between concepts and actions is stored in a database, according to an embodiment.

The capsule database 238 of the intelligent server 230 may store capsules in the form of a concept action network (CAN). The capsule database 238 may store actions for processing a task corresponding to a user's voice input, and parameters required for the actions in the form of a CAN.

The capsule database may store a plurality of capsules (capsule A 310 and capsule B 320) corresponding respectively to a plurality of domains (e.g., applications). One capsule (e.g., capsule A 310) may correspond to one domain (e.g., a geo location or an application). In addition, one capsule may correspond to at least one service provider (e.g., CP 1 331, or CP 2 332) performing a function for a domain related to the capsule. One capsule may include at least one action 410 and at least one concept 420 for performing a designated function.

The natural language platform 232 may generate a plan for performing a task corresponding to a received voice input by using capsules stored in the capsule database. The planner module 232c of the natural language platform may generate a plan by using capsules stored in the capsule database. For example, a plan can be created by using the actions 311 and 313 and the concepts 312 and 314 of capsule A 310, and the action 321 and the concept 322 of capsule B 320.

Figure 4:
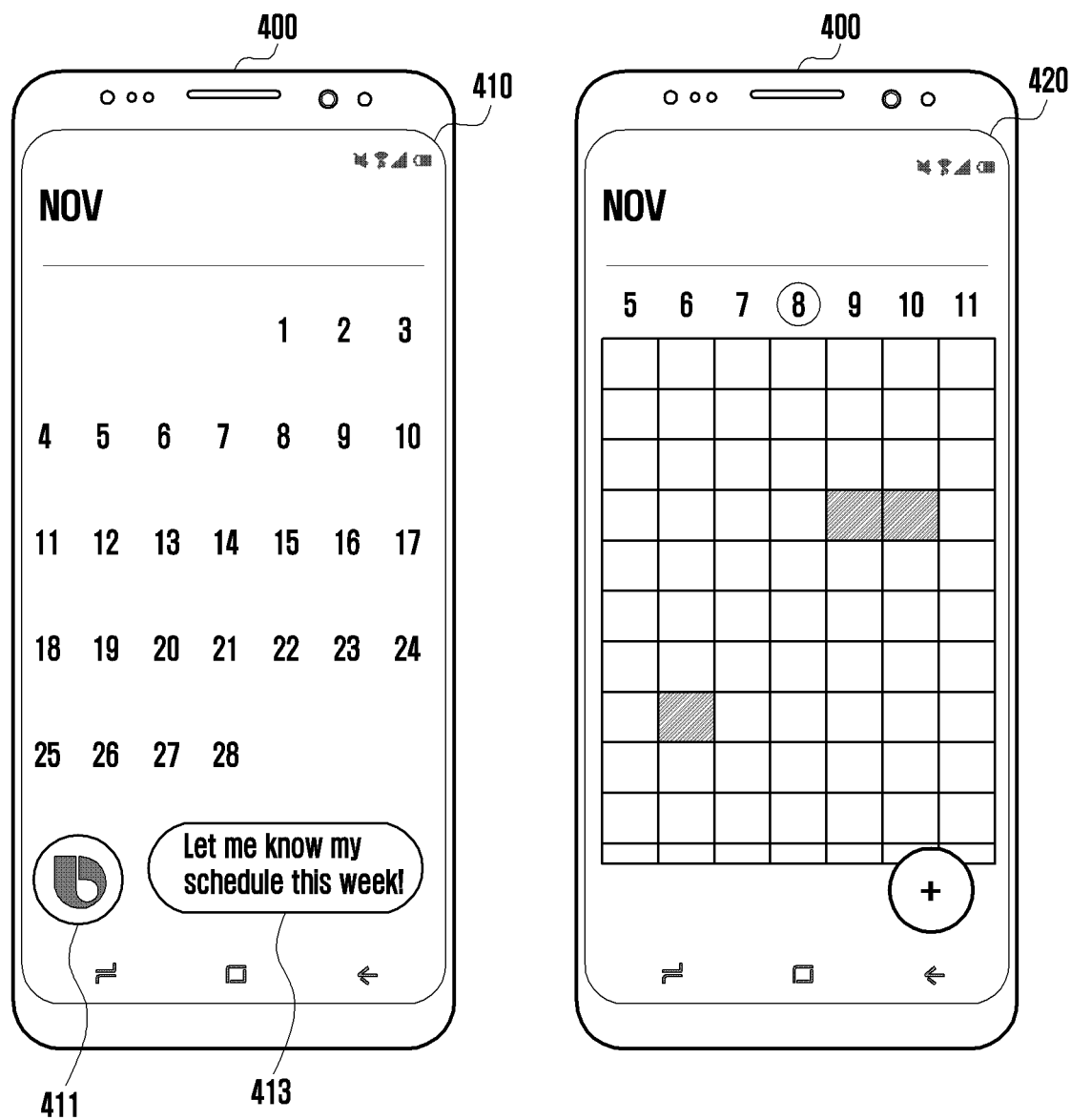
FIG. 4 illustrates a user terminal outputting a screen for processing a voice input received through an intelligent application, according to an embodiment.

FIG. 4 illustrates a user terminal outputting a screen for processing a voice input received through an intelligent application, according to an embodiment.

The user terminal 400 may run an intelligent app to process a user input through the intelligent server 230.

When the user terminal 400 recognizes a designated voice input (e.g., a "wake up!" input) or receives an input through a hardware key (e.g., a dedicated hardware key), the user terminal 400 may execute an intelligent app for processing the voice input. For example, the user terminal 400 may execute an intelligent app while the schedule app is running. The user terminal 400 may display an object (e.g., icon 411) corresponding to the intelligent app on the display 410. The user terminal 400 may receive a voice input corresponding to a user utterance. For example, the user terminal 400 may receive a voice input "Let me know my schedule this week!". The user terminal 400 may output the user interface (UI) (e.g., input window) of the intelligent app including text data 413 corresponding to the received voice input on the display 410.

The user terminal 400 may display a result corresponding to the received voice input on the display 420. For example, the user terminal 400 may receive a plan corresponding to the received user input, and display the schedule of this week on the display 420 according to the plan.

Figure 5:
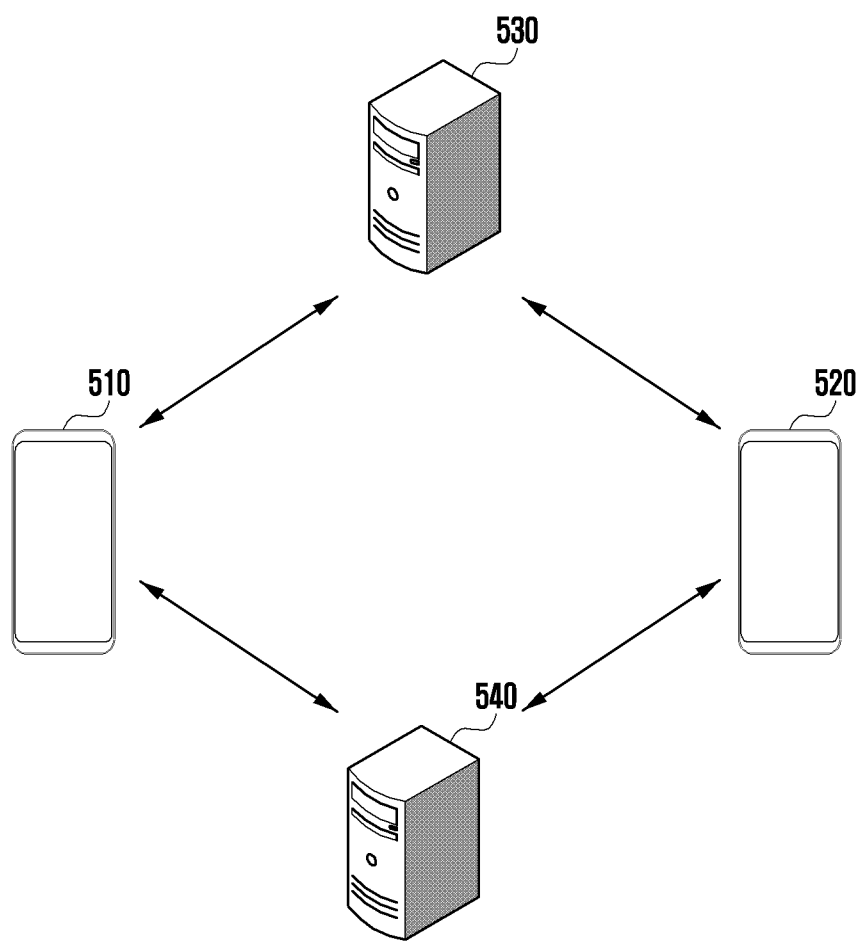
FIG. 5 illustrates individual devices of a voice command sharing system, according to an embodiment.

FIG. 5 illustrates individual devices of a voice command sharing system, according to an embodiment.

With reference to FIG. 5, the voice command sharing system includes a first electronic device 510, a second electronic device 520, an utterance processing server 530, and an utterance sharing server 540. Here, the voice command sharing system may include at least some components of the integrated intelligent system of FIG. 2. For example, the first electronic device 510 and the second electronic device 520 may include at least some of the components that are included in the user terminal 210 in FIG. 2, and the utterance processing server 530 may include at least some of the configurations and/or functions of the intelligent server 230 in FIG. 2.

The first electronic device 510 and the second electronic device 520 may be devices of the same type (e.g., smartphones). Among electronic devices of the same type (e.g., smartphones), the device that generates a voice commands and shares it with another electronic device is referred to as the first electronic device 510, and the device that receives or obtains a voice command through sharing is referred to as the second electronic device 520. Hence, the same device may be the first electronic device 510 or the second electronic device 520 depending on the situation.

The first electronic device 510 may receive a voice signal corresponding to a user's utterance by using a microphone and transmit the received voice input to the utterance processing server 530. The utterance processing server 530 may convert the voice input received from the first electronic device 510 into text data, process the voice input based on the text data, and provide data including a plan, a result and/or a request as a processing result to the first electronic device 510. The voice input processing of the utterance processing server 530 may be the same as that of the intelligent server 230 in FIG. 2.

The first electronic device 510 may map a single voice command to various functions to be performed by the electronic device. A quick command function may be used in an electronic device supporting various functions or in an AI speaker that controls Internet of things (IoT) devices.

The first electronic device 510 may share a voice command (e.g., a text command) obtained through a user's voice input with the second electronic device 520. For example, the user of the first electronic device 510 may share the voice command created by the user with other users or may upload it to the market for downloading and usage. The first electronic device 510 may share voice commands with other devices including the second electronic device 520 through the utterance sharing server 540.

In sharing of voice commands, the values (e.g., a command, a supplementary information, or a plan and result) at the time of creation are retained, and consideration may not be given to the device that receives them (e.g., second electronic device 520). Hence, due to differences in environment and user information of individual devices, when an utterance for a command obtained through sharing is made on the second electronic device 520, the second electronic device 520 may operate differently from the first electronic device 510 having created the command for sharing. In addition, it may be difficult to determine whether a voice command obtained through sharing will operate normally in the second electronic device 520 until the voice command is actually executed by the second electronic device 520.

When a voice command created by the first electronic device 510 is shared with the second electronic device 520, the shared voice command may be verified and converted so as to be operable in the second electronic device 520.

Figure 6:
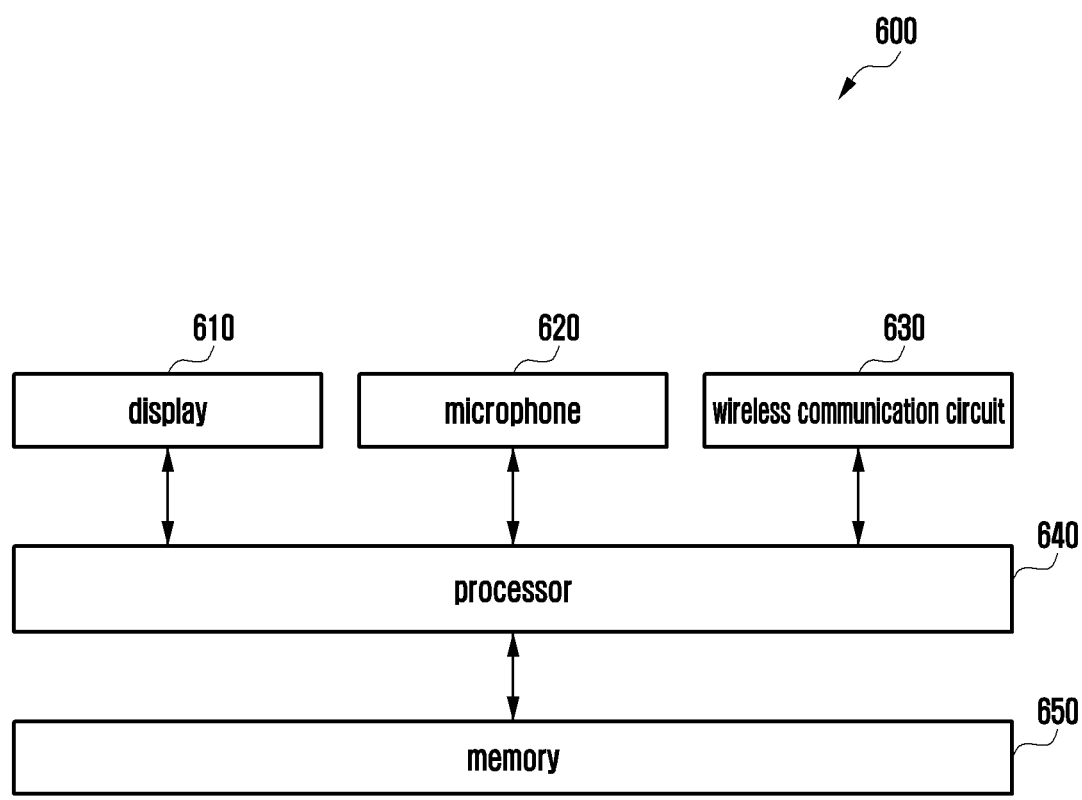
FIG. 6 is a block diagram of an electronic device, according to an embodiment.

FIG. 6 is a block diagram of an electronic device, according to an embodiment.

As shown in FIG. 6, the electronic device 600 includes a display 610, a microphone 620, a wireless communication circuit 630, a processor 640, and a memory 650. The electronic device 600 may include at least some of the configurations and/or functions of the electronic device 101 in FIG. 1 and/or the user terminal 210 in FIG. 2. The components of the electronic device 600 may be operatively, functionally, and/or electrically connected to each other.

The electronic device 600 may operate, according to the usage state, as a first electronic device 510 of FIG. 5 sharing a voice command with another device, or as a second electronic device 520 of FIG. 5 receiving a voice command through sharing.

The display 610 may display various images under the control of the processor 640. For example, the display 610 can be implemented as a liquid crystal display (LCD), a light-emitting diode (LED) display, an organic light-emitting diode (OLED) display, or a micro electromechanical systems (MEMS) display, or an electronic paper display. The display 610 may be configured as a touchscreen that senses a touch input and/or a proximity touch input (or a hovering input) with a body part (e.g., a finger) or an input device (e.g., a stylus pen). The display 610 may include at least some of the configurations and/or functions of the display device 160 in FIG. 1.

The microphone 620 may collect external sounds such as a user's voice and convert it into a voice signal being digital data. The electronic device 600 may include the microphone 620 at a portion of the housing, or may receive a voice signal collected from an external microphone connected through a wired/wireless connection.

The wireless communication circuit 630 may communicate with an external device (e.g., a second electronic device 520, an utterance processing server 530, or an utterance sharing server 540 in FIG. 5) through a wireless network (e.g., a fourth generation (4G) network, a long term evolution (LTE) network, a fifth generation (5G) network, or a new radio (NR) network). The wireless communication circuit 630 may include at least some of the configurations and/or functions of the communication module 190 in FIG. 1.

The memory 650 may include a volatile memory and a nonvolatile memory, and may store various data temporarily or permanently. The memory 650 may store various instructions that can be executed by the processor 640. Such instructions may include arithmetic and logic operations, data transfer operations, input/output operations, and control operations that can be recognized by the processor 640. The memory 650 may store the programs 140 in FIG. 1.

The processor 640 may have a configuration capable of performing operations related to control, communication and/or data processing for the components of the electronic device 600, and may be configured to include one or more processors. The processor 640 may include at least some of the configurations and/or functions of the processor 120 in FIG. 1.

Hereinafter, although there is no limit to the operations and data processing functions that can be realized by the processor 640 in the electronic device 600, a detailed description will be given of various features in which the electronic device 600 shares a voice command with another device when the electronic device 600 operates as a first electronic device 510, or verify and convert a voice command obtained through sharing when the electronic device 600 operates as a second electronic device 520. The operations of the processor 640 may be performed by loading instructions stored in the memory 650.

Next, a description is given of operations of the components (e.g., a processor 640) of the electronic device 600 when the electronic device 600 shares a voice command with another device.

The processor 640 may execute an application for sharing a voice command and display an execution screen on the display 610. The processor 640 may select a voice command to be shared with another device according to a user input. Here, the voice command may be a text command corresponding to a voice input previously input by the user through the microphone 620.

The processor 640 may obtain first supplementary information related to the voice command. The first supplementary information is data necessary for the processing of the voice command, and may include information about the electronic device 600 and/or data about the utterance processing server (or, a first external server) that processes the voice command to obtain result data (e.g., first data). For example, the first supplementary information may include parameter tagged text, location information of the electronic device 600 (e.g., global positioning system (GPS) information), a time of a voice input, name information, version information, category information of the running capsule, a version of the application that executes the function according to the voice command, a version of the speech recognition application, a model name of the electronic device 600, information about the peripheral device interworking with the electronic device 600, a language setting value, and contact information stored in the electronic device 600.

The processor 640 may transmit a voice command to the utterance processing server 530 (or, a first external server), and may obtain the processing result of the voice command and information necessary for performing the voice command (e.g., at least some of the first supplementary information) from the utterance processing server 530. Here, the processing result of a voice command received from the utterance processing server 530 may include at least a portion of the result, the plan, and the request described with reference to FIG. 2, and will be referred to as first data.

The processor 640 may process a voice command by using a voice recognition engine installed in the electronic device 600 without transmitting the voice command to the utterance processing server. In this case, the processor 640 may process a voice input by using the internal speech recognition engine if the voice input can be processed by the internal speech recognition engine, and may transmit the input voice to the utterance processing server if otherwise.

The processor 640 may use the wireless communication circuit 630 to transmit the first data and the first supplementary information to another device via the utterance sharing server 540 (or a second external server).

The processor 640 may register data necessary for sharing a voice command (e.g., a voice command, first data, or first supplementary information) in the utterance sharing server 540, and download a unique key value for accessing the data. The processor 640 may generate a link including a unique key value (e.g., a deep link or a web link) and transmit it to a different device through the network for sharing. In this case, the different device may obtain the data (e.g., a voice command, first data, or first supplementary information) from the utterance sharing server by using the received unique key value.

The processor 640 may register data necessary for sharing a voice command (e.g., first voice command data or first supplementary information) and information about a different device that will share the voice command in the utterance sharing server. In this case, the utterance sharing server may transmit a push message to the different device by using a push service, and the different device may download the data from the utterance sharing server by using the push message.

Next, a description is given of operations of the components (e.g., processor 640) of the electronic device 600 when the electronic device 600 receives a voice command through sharing from another device.

The processor 640 may obtain a voice command, first data, and first supplementary information from the utterance sharing server (or the second external server) by using the wireless communication circuit 630. Here, the voice command is a command generated by an utterance input to a different device (e.g., first electronic device 510 in FIG. 5), and the first data may be related to a function to be executed when the voice command is input to the different device.

The processor 640 may check the result value generated when the voice command obtained from the utterance sharing server is executed in the utterance processing server based on the information about the electronic device 600 (e.g., second supplementary information). In other words, the processor 640 may obtain second data related to a function to be executed when the command is input to the electronic device 600.

The second supplementary information is information related to the electronic device 600 corresponding to the first supplementary information, and may include parameter tagged text, location information of the electronic device 600 (e.g., GPS information), a voice input time, name information, version and category information of the running capsule, a version of the application that executes the function according to the voice command, a version of the speech recognition application, a model name of the electronic device 600, information about the peripheral device interworking with the electronic device 600, a language setting value, and contact information stored in the electronic device 600.

The second data may be obtained by processing a voice command using a speech recognition engine installed in the electronic device 600.

The processor 640 may verify whether the voice command is executable on the electronic device 600 based on the first data obtained from the utterance sharing server and the second data obtained from the utterance processing server (or internal speech recognition engine). The processor 640 may compare the first data and the second data, and determine whether the voice command is executable on the electronic device 600 according to the comparison result.

If the first data and the second data are the same, the processor 640 may map the voice command to the first data and/or the second data and store it in the memory 650. Later, when the user makes an utterance for the voice command by using the microphone 620 of the electronic device 600, the same result may be produced as in the case where the voice command is input to a different device that has created the voice command for sharing. For example, the same application may be executed, or the same action may be performed in the application.

If the first data and the second data are different, the processor 640 may change at least one of the voice command or the second data.

The processor 640 may change at least one of the voice command or the second data based on the second supplementary information related to the electronic device 600. For example, the processor 640 may change at least one of the voice command or the second data based on information stored in a first application that will execute the voice command. When the first application related to the voice command is not installed in the electronic device 600, the processor 640 may display information required for the installation of the first application on the display 610. Alternatively, when the first application related to the voice command is not installed in the electronic device 600, the processor 640 may change at least a portion of the second data so that the voice command is executed by a second application installed in the electronic device 600.

Examples in which the processor 640 changes the voice command and/or the second data will be described in more detail with reference to FIG. 10.

When the voice command obtained from the utterance sharing server is not executable on the electronic device 600, the processor 640 may delete (or dim) all the received data.

The processor 640 may store the changed voice command and/or second data in the memory 650. In addition, the processor 640 may display information about the changed voice command and/or second data through a voice recognition application on the display 610.

Figure 7:
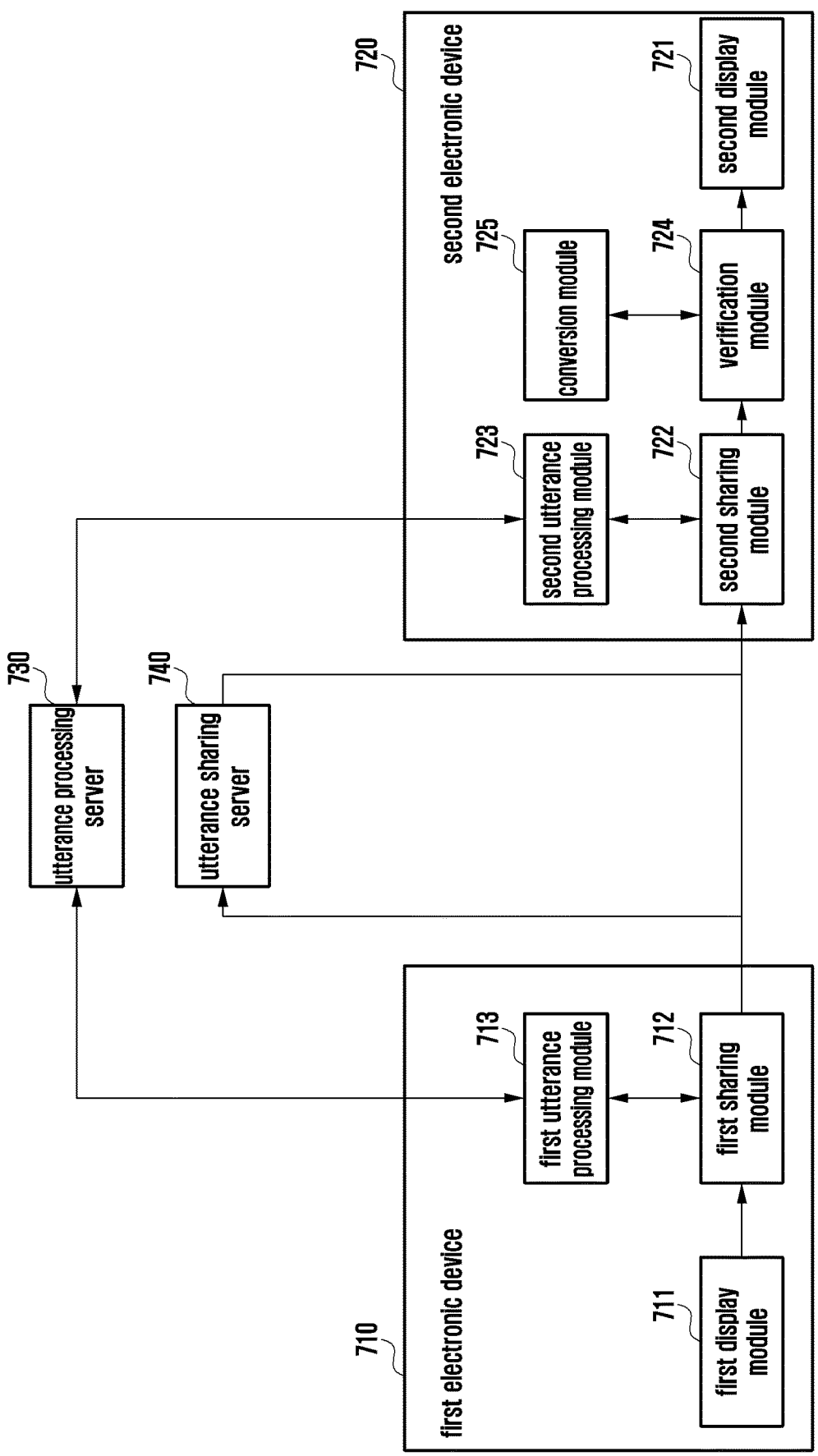
FIG. 7 is a block diagram of each device of the voice command sharing system, according to an embodiment.

FIG. 7 is a block diagram of each device of the voice command sharing system, according to an embodiment.

FIG. 7 illustrates an embodiment in which the processing of the voice input is performed by an external utterance processing server 730. With reference to FIG. 7, the voice command sharing system includes a first electronic device 710, a second electronic device 720, an utterance processing server 730, and an utterance sharing server 740.

The first electronic device 710 includes a first display module 711, a first utterance processing module 713, and a first sharing module 712. Here, the first display module 711 may correspond to the display 610 in FIG. 6, and the first utterance processing module 713 and the first sharing module 712 may be configured as software modules and may be executed by a processor 640.

The second electronic device 720 includes a second display module 721, a second utterance processing module 723, a second sharing module 722, a conversion module 725, and a verification module 724. Here, the second display module 721 may correspond to the display 610 in FIG. 6, and the second utterance processing module 723, the second sharing module 722, the conversion module 725, and the verification module 724 may be configured as software modules and may be executed by a processor.

As previously described with reference to FIG. 6, according to the usage state, one electronic device 600 may operate as the first electronic device 710 that shares a voice command with another device or may operate as the second electronic device 720 that receives a voice command through sharing.

The first electronic device 710 may execute an application for sharing voice commands and display the execution screen on the first display module 711. The user may select a voice command to be shared with the second electronic device 720 through the application.

The first sharing module 712 may transmit the selected voice command to the first utterance processing module 713 to obtain first supplementary information related to the voice command. Here, the first supplementary information is data necessary for the processing of the voice command, and may include information about the first electronic device 710 and/or data about the utterance processing server 730 (or first external server) that processes the voice command to obtain result data (e.g., first data). The first supplementary information may include parameter tagged text, location information of the first electronic device 710 (e.g., GPS information), voice input time, name information, version and category information of the running capsule, version of the application that executes the function according to the voice command, version of the speech recognition application, model name of the first electronic device 710, information about the peripheral device interworking with the first electronic device 710, a language setting value, and contact information stored in the first electronic device 710.

The first utterance processing module 713 may transmit the voice command (or voice input) to the utterance processing server 730 (or first external server).

The utterance processing server 730 may obtain a voice command and first supplementary information, and generate first data as a processing result. For example, the utterance processing server 730 may generate a plan for performing a task corresponding to the voice command. Here, the plan can be generated by an artificial intelligence system. The utterance processing server 730 may produce a result according to the generated plan. Here, the result may include a function to be executed by the first electronic device 710 (e.g., execution of a specific application, or execution of a specific function of a given application) when an utterance for the voice command is input. The utterance processing server 730 may transmit first data including the plan and/or result to the first utterance processing module 713 of the first electronic device 710.

The first sharing module 712 may collect data (e.g., a voice command, first data, and first supplementary information) received from the first utterance processing module 713 and transmit it to the utterance sharing server 740. The first sharing module 712 may store data in the utterance sharing server 740 and transmit a unique key for accessing the data to the second sharing module 722 of the second electronic device 720, and the second sharing module 722 may download the data from the utterance sharing server 740 by using the key. Additionally or alternatively, when the first sharing module 712 transmits data and recipient information to the utterance sharing server 740, the utterance sharing server 740 may push the received data to the second sharing module 722. Additionally or alternatively, the first sharing module 712 may transmit data in a deep link form directly (or over a network) to the second sharing module 722 without using the utterance sharing server 740.

The second sharing module 722 of the second electronic device 720 may receive data (e.g., a voice command, first data, or first supplementary information) from the utterance sharing server 740 (or the first sharing module 712). The second utterance processing module 723 may transmit the voice command among the data received by the second sharing module 722 to the utterance processing server 730. The second utterance processing module 723 may provide second supplementary information related to the second electronic device 720 to the utterance processing server 730 together with the voice command.

The second utterance processing module 723 may check the result that will be produced when the voice command obtained from the utterance sharing server 740 is executed in the utterance processing server 730 based on the information on the second electronic device 720 (e.g., second supplementary information). Then, the second utterance processing module 723 may transmit the voice command, the first data obtained from the first electronic device 710, and the second data obtained through the utterance processing server 730 to the verification module 724.

The verification module 724 may compare the first data and the second data to check whether the corresponding voice command is executable on the second electronic device 720. In other words, for the same voice command, the verification module 724 may compare the information (e.g., first data) obtained through the utterance processing server 730 and the first utterance processing module 713 in the first electronic device 710 with the result (e.g., second data) obtained through the utterance processing server 730 and the second utterance processing module 723 in the second electronic device 720.

A voice command working in the first electronic device 710 may not work in the second electronic device 720. This may be due to differences in, for example, installed applications, versions thereof, user parameters, or connected peripheral devices.

The verification module 724 may check whether the voice command is executable by an utterance on the second electronic device 720 based on the difference between the first data and the second data, and may create data separately indicating the executability by an utterance and parts to be changed through marking (or parameter tagging). In addition, the verification module 724 may transmit the parameter-tagged data to the conversion module 725.

The conversion module 725 may change the voice command and/or second data according to a preset policy based on the data received from the verification module 724. The conversion module 725 may change applications, capsules, and parameters so that the voice command is executable on the second electronic device 720, and may transmit the changed information to the verification module 724 for additional verification.

When the user of the first electronic device 710 shares the utterance "Please order coffee with A" as a voice command, application A for processing a coffee order may be not installed in the second electronic device 720. In this case, the second electronic device 720 may display information (e.g., a link for downloading an application) for installing application A, which is installed in the first electronic device 710 to process a coffee order, on the second display module 721, and may download the corresponding application according to a user selection.

When a first application (e.g., coffee application A) to execute the voice command is not installed, the second electronic device 720 may change the second data so that the voice command is executed by another application in a similar category (e.g., coffee application B). Alternatively, the user of the second electronic device 720 may configure in advance coffee application B as a preferred application in connection with coffee ordering. In this case, the conversion module 725 may change the second data so as to execute coffee application B designated as a preferred application in the same category although coffee application A is installed in the second electronic device 720. Here, the conversion module 725 may also change the voice command to "Please order coffee with B".

The conversion module 725 may change the second data based on the second supplementary information of the second electronic device 720. For example, when the user of the first electronic device 710 shares the utterance "Place a call to Kim Samsung" as a voice command, the contact information of Kim Samsung may not be present in the contact list of the second electronic device 720. In this case, the second electronic device 720 may receive the contact information from the first electronic device 710 and perform a call function.

When the voice command includes a function to be executed by a peripheral device, the conversion module 725 may change at least some of the voice commands and/or the second data in correspondence with the peripheral device connected to the second electronic device 720. For example, when the first electronic device 710 connected to a speaker with model name D1234 generates a voice command "Play music with the speaker" and shares it with the second electronic device 720, the second electronic device 720 may be able to use a different speaker with model name G567, F890. In this case, the verification module 724 may confirm that the second electronic device 720 cannot play music using the D1234 speaker indicated by the first data, and the second electronic device 720 may notify the user that the G567, F890 speaker connected to the second electronic device 720 is available and may present an user interface for selecting the speaker to be used to play music.

The voice command and the second data processed by the conversion module 725 may be transmitted to the second display module 721, which may display the voice command, an execution result, and conversion information to the user. Here, the voice command changed by the conversion module 725 and a guide for using the voice command received from the first electronic device 710 may be provided.

Figure 8:
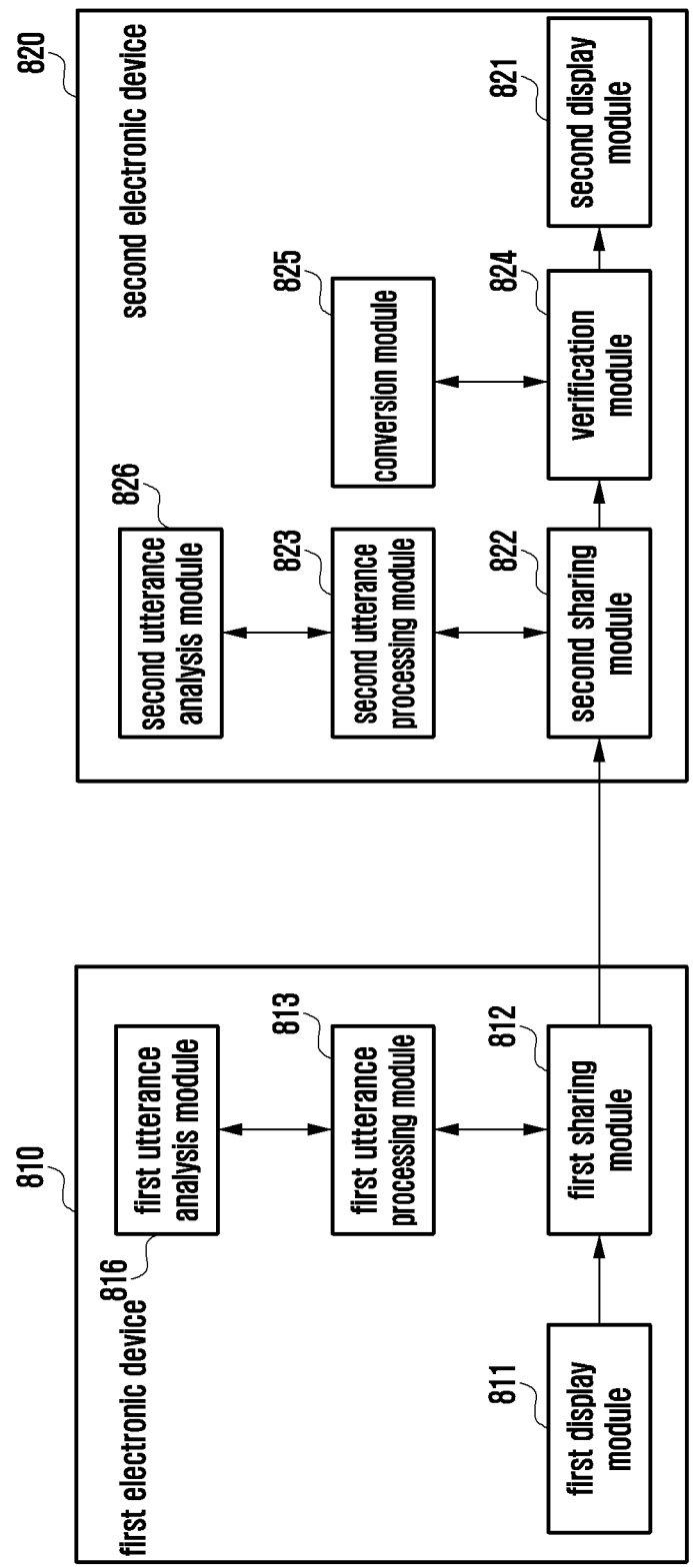
FIG. 8 is a block diagram of each device of the voice command sharing system, according to an embodiment.

FIG. 8 is a block diagram of each device of the voice command sharing system, according to an embodiment.

Compared to the embodiment of FIG. 7, FIG. 8 illustrates an embodiment that can share voice commands without an external utterance processing server or an external utterance sharing server 740. With reference to FIG. 8, the voice command sharing system includes a first electronic device 810 and a second electronic device 820.

The first electronic device 810 includes a first display module 811, a first utterance processing module 813, a first utterance analysis module 816, and a first sharing module 812. Here, the first display module 811 may correspond to the display 610 in FIG. 6, and the first utterance processing module 813 and the first sharing module 812 may be configured as a software module and may be executed by a processor 640. The second electronic device 820 includes a second display module 821, a second utterance processing module 823, a second utterance analysis module 826, a second sharing module 822, a conversion module 825, and a verification module 824. Here, the second display module 821 may correspond to the display 610 in FIG. 6, and the second utterance processing module 823, the second sharing module 822, the conversion module 825, and the verification module 824 may be configured as software modules and may be executed by a processor.

In the following description, the technical features already described in connection with FIG. 7 will not be described. The functions performed by the utterance processing server 730 may be performed by the first utterance analysis module 816 and/or the second utterance analysis module 826.

The first sharing module 812 may transmit a voice command selected on the first display module 811 by the user to the first utterance processing module 813 to obtain first supplementary information related to the voice command.

The first utterance processing module 813 may transmit the voice command (or, voice input) to the first utterance analysis module 816.

The first utterance analysis module 816 may obtain a voice command and first supplementary information, and generate first data as a processing result. Here, the first data may include a function to be executed (e.g., execution data of a specific application or execution data of a specific function of a given application) by the first electronic device 810 when the corresponding utterance is input. The first utterance analysis module 816 may transmit the first data including a plan and/or a result generated by processing the voice command to the first utterance processing module 813.

The first sharing module 812 may transmit the data (e.g., a voice command, first data, or first supplementary information) received from the first utterance processing module 813 to the second sharing module 822 of the second electronic device 820.

The second sharing module 822 may transmit the voice command among the data received from the first sharing module 812 to the second utterance processing module 823 and the second utterance analysis module 826.

The second utterance analysis module 826 may check the result value that is generated when the voice command obtained from the first electronic device 810 is executed based on the information (e.g., second supplementary information) about the second electronic device 820. Then, the second utterance processing module 823 may transmit the voice command, the first data obtained from the first electronic device 810, and the second data obtained through the second utterance analysis module 826 to the verification module 824.

Here, the second utterance analysis module 826 may generate the second data corresponding to the voice command by using the same algorithm as that of the first utterance analysis module 816.

The verification module 824 may compare the first data and the second data to check whether the corresponding voice command is executable on the second electronic device 820. The operation of the verification module 824 is the same as the operation described with reference to FIG. 7.

The conversion module 825 may change the voice command and/or the second data according to a preset policy based on the data received from the verification module 824. The operation of the conversion module 825 is the same as the operation described with reference to FIG. 7.

Figure 9:
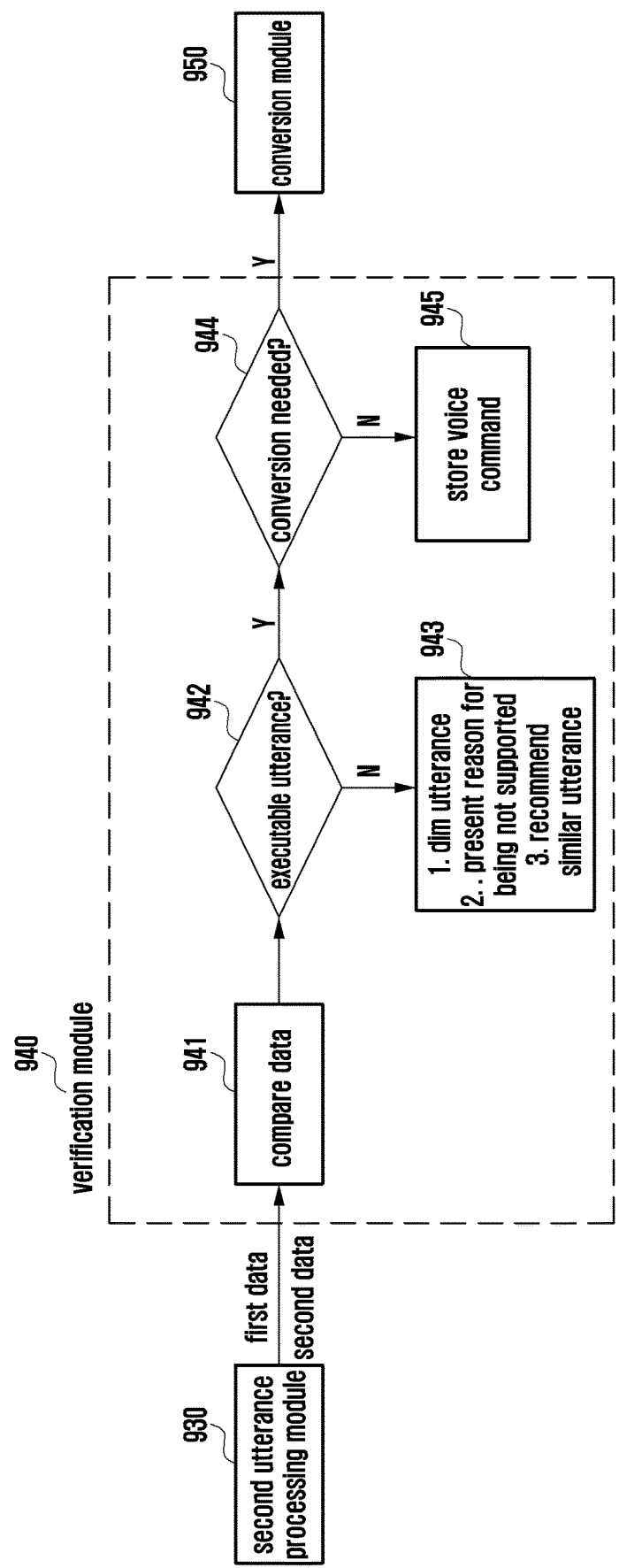
FIG. 9 is a flowchart of a scheme for detecting a command in a verification module of the electronic device, according to an embodiment.

FIG. 9 is a flowchart of a scheme for detecting a command in a verification module of the electronic device, according to an embodiment.

FIG. 9 illustrates the operation performed by the verification module 940 of the second electronic device. As described above, the verification module 940 may be configured as a software module and may be executed by the processor 640 of the second electronic device.

The second utterance processing module 930 may transmit, to the verification module 940, the first data obtained from the first electronic device and the second data obtained from the utterance processing server 730 or the second utterance analysis module 826.

In step 941, the verification module 940 (or processor) compares the first data and the second data to check whether the voice command is executable on the second electronic device.

In step 942, the verification module 940 checks whether the voice command is executable on the second electronic device based on the comparison between the first data and the second data. In step 943, if the voice command is not executable, the verification module 940 dims the corresponding voice command, indicates a reason why the voice command cannot be executed on the second electronic device, and recommends a similar voice command through an application.

A voice command working in the first electronic device may not work in the second electronic device due to differences in, for example, installed applications, versions thereof, user parameters, or connected peripheral devices.

In step 944, if the voice command is executable on the second electronic device, the verification module 940 checks whether it is necessary to change the voice command and/or the second data. In step 945, if such change is not necessary, the verification module 940 maps the voice command to the second data and stores it in the memory.

If it is necessary to change the voice command and/or the second data, the verification module 940 may transmit the voice command and/or the second data to the conversion module 950. The verification module 940 may create data separately indicating the executability by an utterance and parts to be changed through marking (or parameter tagging). In addition, the verification module 940 may transmit the parameter-tagged data to the conversion module 950.

Figure 10:
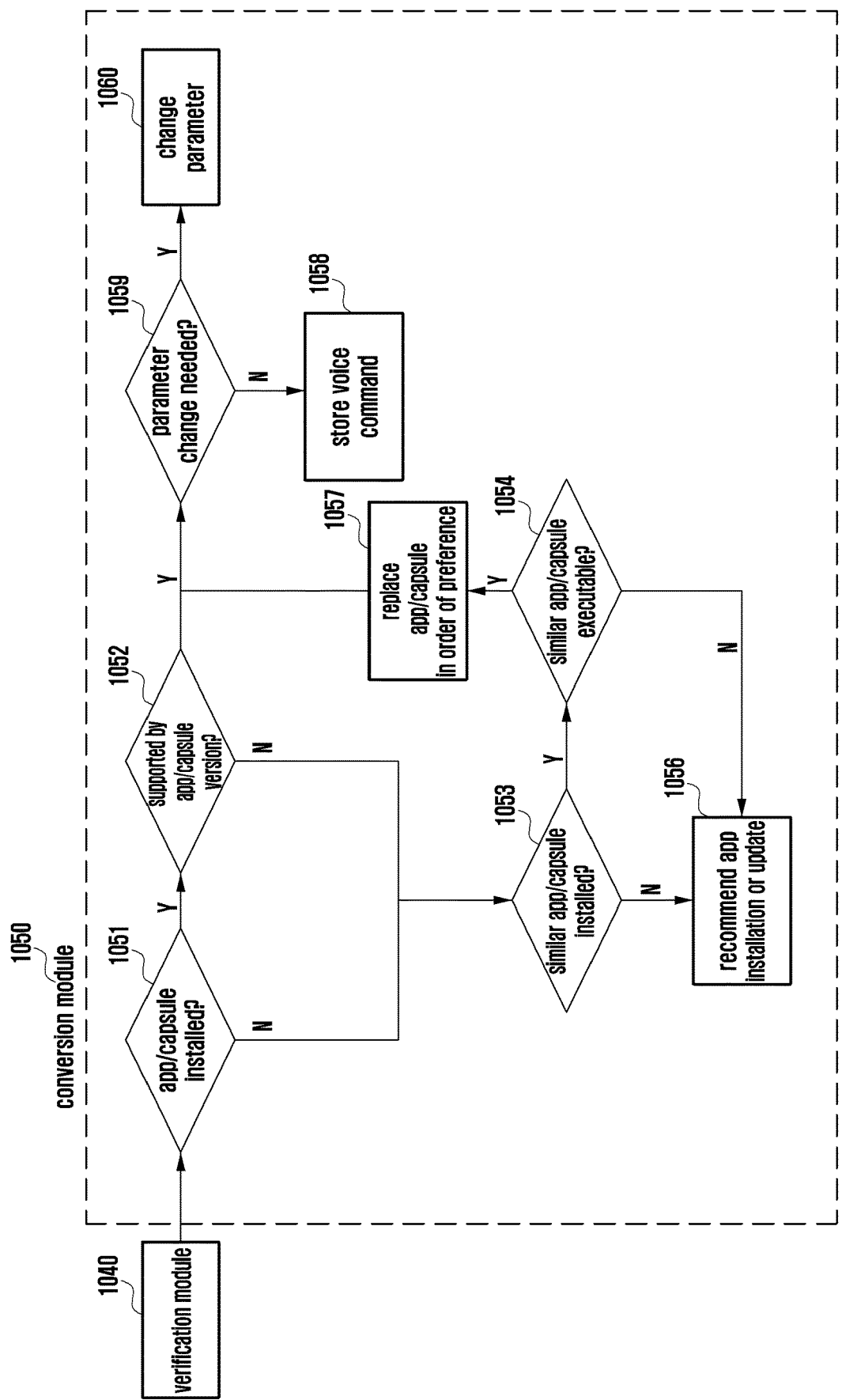
FIG. 10 is a flowchart of a scheme for converting a command in a conversion module of the electronic device, according to an embodiment.

FIG. 10 is a flowchart of a scheme for converting a command in the conversion module of the electronic device, according to an embodiment.

FIG. 10 illustrates the operation performed by the conversion module of the second electronic device. As described above, the conversion module 1050 may be configured as a software module and may be executed by the processor 640 of the second electronic device.

If it is necessary to change the voice command and/or the second data, the verification module 1040 may transmit them to the conversion module 1050. The conversion module 1050 may change the voice command and/or the second data according to a preset policy based on the data received from the verification module 1040.

In step 1051, the conversion module 1050 (or processor) checks whether an application or capsule for executing the voice command is installed based on the voice command and the first data. In step 1052, if the corresponding application or capsule is installed, the conversion module 1050 checks whether the version of the application or capsule supports execution of the voice command.

If an application or capsule for executing the voice command is not installed or the version of the installed application or capsule does not support execution of the voice command, in step 1053 the conversion module 1050 checks whether an application or capsule similar to the desired application or capsule is installed. If a similar application or capsule is installed, in step 1054 the conversion module 1050 checks whether the voice command is executable by the similar application or capsule. If a similar application or capsule is not installed or the voice command is not executable by the similar application or capsule, in step 1056 the conversion module 1050 provides information for installing or updating the desired application through the display, and performs a necessary installation or an update according to a user selection.

In step 1057, the conversion module 1050 changes a portion of the second data based on the preference for the application or capsule specified by the user on the second electronic device. For example, when the action corresponding to the voice command is execution of application A, and the user of the second electronic device designates application B of the same category as application A as a preferred application, the conversion module 1050 may change the second data so that the action thereof is execution of application B.

If an application or capsule for executing the voice command is installed and the version of the installed application or capsule supports execution of the voice command, in step 1059 the conversion module 1050 checks whether it is necessary to change a parameter. For example, the conversion module 1050 may change a parameter of the second data based on the second supplementary information of the second electronic device. If it is not necessary to change a parameter, in step 1058 the conversion module 1050 maps the voice command to the second data and store the mapped information.

If it is necessary to change a parameter, in step 1060 the conversion module 1050 changes the parameter of the second data based on the second supplementary information of the second electronic device. For example, when the user of the first electronic device shares the utterance (i.e., speaks a phrase) "Place a call to Kim Samsung" as a voice command, the contact information of Kim Samsung may be not present in the contact list of the second electronic device. In this case, the second electronic device may receive the contact information from the first electronic device 710 and store it. Additionally or alternatively, if different contact information for the same name is stored in the first electronic device and the second electronic device, the parameter (e.g., the contact) of the second data may be changed based on the first data (e.g., contact information stored in the first electronic device).

The verification module 1040 and the conversion module 1050 of the second electronic device may repeat the operation of verification and conversion on the changed voice command and changed second data.

The conversion module 1050 may change the voice command and/or the second data in the following ways.

For example, when the voice command generated by the first electronic device is "Place a call to Kim Samsung", the first electronic device may check the voice command and contact information (e.g., phone number or email address) of Kim Samsung stored in a contacts application being a function performed when the voice command is executed, and share the first data indicating a function of call placement with a call application with the second electronic device. In addition, the first electronic device may share the contact information of Kim Samsung stored in the first electronic device as the first supplementary information.

When the same contact information (e.g., phone number or e-mail) as that of the received first additional information is present but under a different name (e.g., "Lee Samsung") in the contacts application of the second electronic device, the conversion module 1050 of the second electronic device may change the search target to "Lee Samsung" in the second data. In this case, when the user of the second electronic device makes an utterance (e.g., speaks a phrase) "Place a call to Kim Samsung", the second electronic device may find the contact information of Lee Samsung which has been changed and stored in the contacts application and place a call, or may change the voice command to "Place a call to Lee Samsung". If contact information identical to the contact information of the received first supplementary information is not present in the contacts application of the second electronic device, the conversion module 1050 of the second electronic device may store a name (e.g., "Kim Samsung") and contact information in the contacts application based on the first supplementary information.

When the voice command generated by the first electronic device is "Please order pizza", the first electronic device may share the voice command and first data indicating a function of ordering pizza with pizza application A, which is a function performed when the voice command is executed, with the second electronic device. In this case, the second electronic device may check whether pizza application A is installed in the second electronic device based on the received first data. Here, although pizza application A is installed, if pizza application B registered by the user as a preferred application among the applications of the same category is also installed, the conversion module 1050 of the second electronic device may change the function corresponding to the voice command "Please order pizza" to the function of ordering pizza by executing pizza application B. In addition, if pizza application A is not installed in the second electronic device, the conversion module 1050 may check whether an application of the same category is installed, and change the parameter of the second data to perform the same function by executing the application of the same category.

When the voice command generated by the first electronic device is "Please pay with card A", the first electronic device may share the voice command and first data indicating a function of making payments using card A in a payment application, which is a function performed when the voice command is executed, with the second electronic device. In this case, the second electronic device may check whether card A is registered in the second electronic device based on the received first data and first supplementary information. If card A is not registered, the second electronic device may change the parameter of the second data to a function of making payments using information on card B registered in the second electronic device.

When the voice command generated by the first electronic device is "Please lower the air conditioning temperature", the first electronic device may share the voice command and first data indicating a function of adjusting the temperature of air conditioner A connected to the first electronic device, which is a function performed when the voice command is executed, with the second electronic device. In this case, the second electronic device may check whether there is a peripheral device of an air conditioner type of device connected to the second electronic device based on the received first data and first supplementary information. If there is no connected peripheral device, the second electronic device may change the parameter to a peripheral device of the same type registered in the user account of the second electronic device. If there is no other peripheral device registered in the user account of the second electronic device, the second electronic device may search for a peripheral device currently connectable to the second electronic device and change the parameter to the found peripheral device.

The policy for converting the second data by the conversion module 1050 of the second electronic device may include priority. For example, the conversion module 1050 may check whether the voice command is executable on the second electronic device and may make a change for executability through a capsule, an application, or a parameter conversion. If this is not possible, the conversion module 1050 may recommend an installation of or an update with an application capable of executing a function corresponding to the voice command.

Figure 11A:
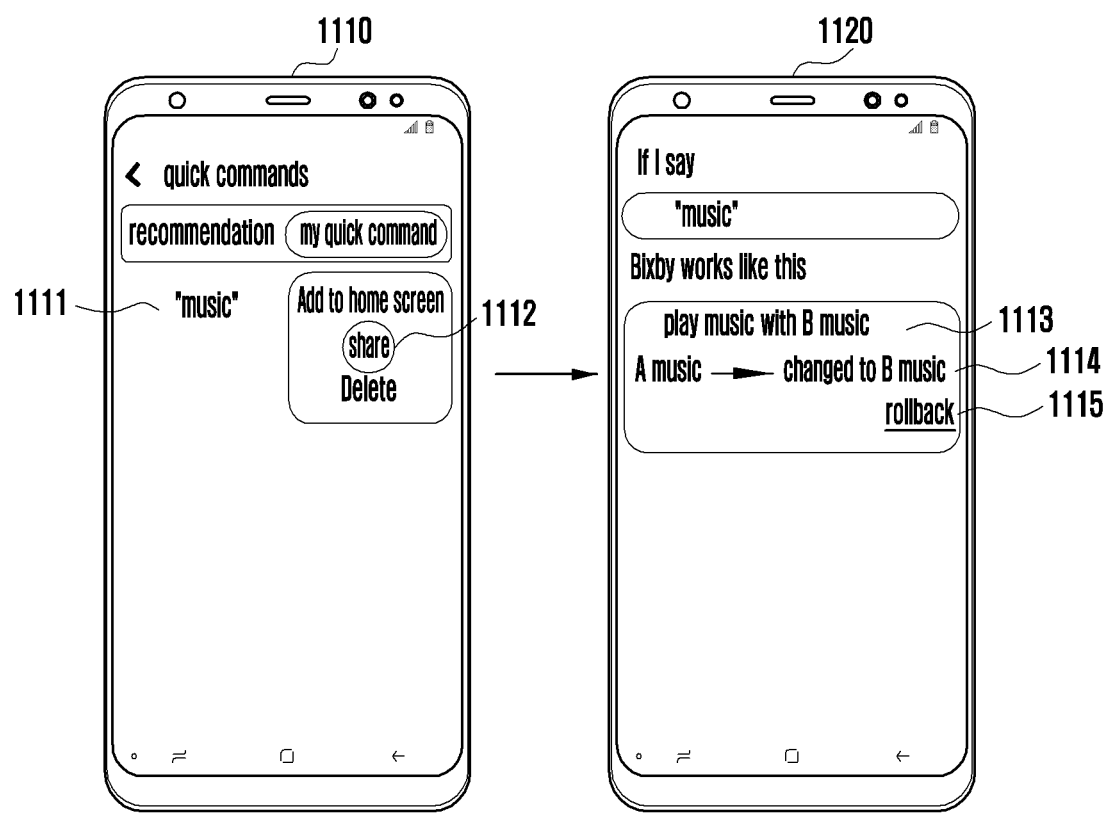
FIG. 11A is a screen representation of a voice command application in the electronic device, according to an embodiment.
Figure 11B:
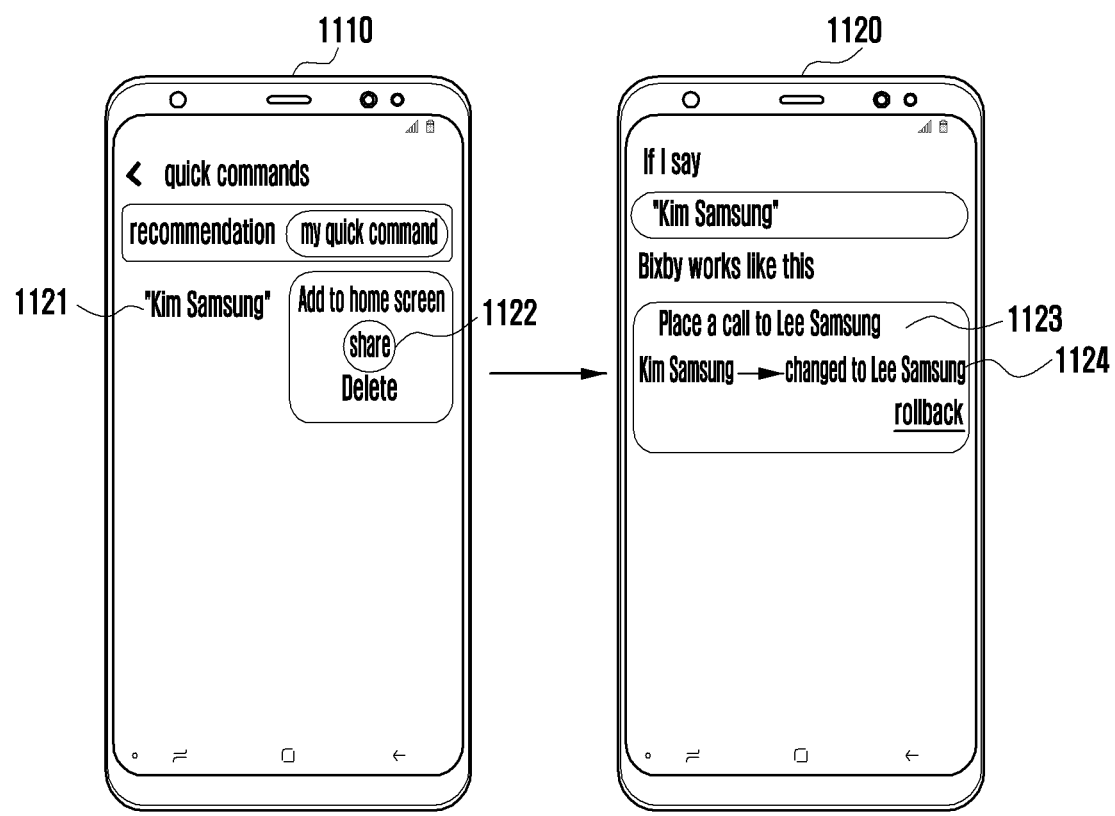
FIG. 11B is a screen representation of a voice command application in the electronic device, according to an embodiment.
Figure 11C:
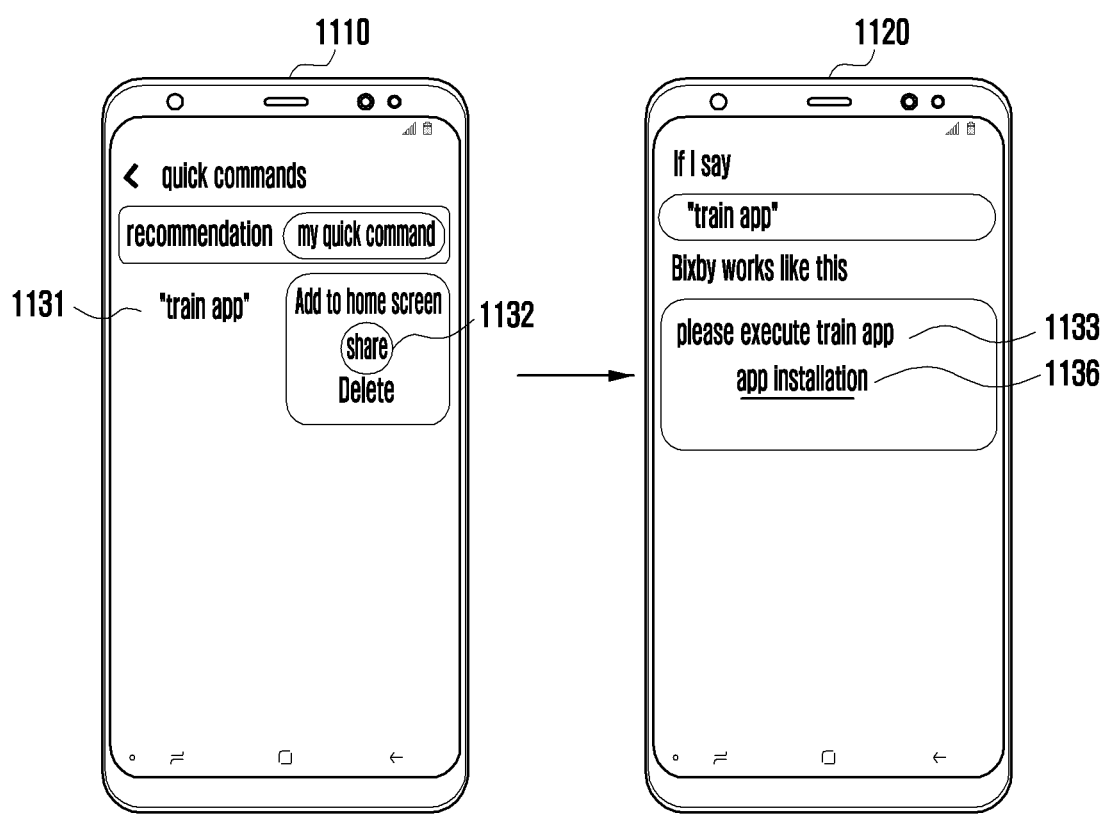
FIG. 11C is a screen representation of a voice command application in the electronic device, according to an embodiment.

FIGS. 11A, 11B and 11C are screen representations of a voice command application in the electronic device, according to an embodiment.

FIGS. 11A to 11C illustrate application screens of a first electronic device 1110 that shares a voice command with another device and a second electronic device 1120 that receives the voice command from the first electronic device 1110 through sharing.

With reference to FIG. 11A, the first electronic device 1110 may display an application screen for voice command sharing. A list of voice commands stored by the user or obtained from other electronic devices may be displayed on the application screen. Here, the user may select "music" 1111 from among the voice commands, and select "share" 1112. When the user selects a voice command and "share", a menu for selecting a sharing device such as the second electronic device 1120 may be additionally displayed.

In the first electronic device 1110, the function executed when voice command "music" 1111 is input may be a function of playing music with music application A. In response to the input of voice command sharing, the first electronic device 1110 may transmit the selected voice command, the first data indicating the above function, and supplementary information about the first electronic device 1110 to the second electronic device 1120.

In the second electronic device 1120, music application A may be not installed, and music application B of the same category as music application A may be installed. The verification module of the second electronic device 1120 may confirm that the execution of music application A is not possible on the second electronic device 1120 unlike the first electronic device 1110 when voice input "music" is issued on the basis of the result of comparison between the first data and the second data, and the conversion module may change the parameter of the second data to a function of executing music application B of the same category as music application A.

With reference to FIG. 11A, the second electronic device 1120 displays a voice command "music" received through sharing and a function to be performed accordingly on the application screen for voice command sharing. As the function corresponding to "music" is changed to the execution of music application B according to a change in the parameter of the second data, the second electronic device 1120 may display the changed function 1113. In addition, the second electronic device 1120 may display the contents 1114 converted by the conversion module (the contents that are changed from music application A to application music B), and may display a rollback item 1115, which can be selected by the user to execute the shared function as it is.

With reference to FIG. 11B, the first electronic device 1110 transmits, to the second electronic device 1120, a voice command "Kim Samsung" 1121 and first data indicating a function of placing a call with the contact information of Kim Samsung in the corresponding contacts application. Here, the first electronic device 1110 may transmit, as first supplementary information, a name "Kim Samsung" and contact information thereof (e.g., a phone number) stored in the contacts application.

The second electronic device 1120 may receive the first data and the first supplementary information, and check "Kim Samsung" and the received contact information in the contacts application. Here, the same contact information may be stored but under a different name (e.g., "Lee Samsung") in the contacts application of the second electronic device.

The verification module of the second electronic device 1120 may confirm that a call connection with "Kim Samsung" in the contacts application is not possible on the second electronic device 1120, unlike the first electronic device 1110 when voice input "Kim Samsung" is issued on the basis of the result of a comparison between the first data and the second data. The conversion module can change the parameter of the second data to place a call to "Lee Samsung" with the same phone number.

With reference to FIG. 11B, the second electronic device 1120 displays a voice command "Kim Samsung" received through sharing and a function to be performed on the application screen for voice command sharing. As the function corresponding to "Kim Samsung" is changed to placing a call with contact information of "Lee Samsung", according to a change in the parameter of the second data, the second electronic device 1120 may display a changed function 1123, changed contents 1124, and a rollback item.

The conversion module may change the voice command to "Lee Samsung" based on the second supplementary information (e.g., contact information) of the second electronic device 1120.

With reference to FIG. 11C, the first electronic device 1110 transmits, to the second electronic device 1120, a voice command "train app" and first data indicating a function of executing a train application corresponding to the voice command. Here, the first electronic device 1110 may transmit information about the application executing the voice command and the version thereof as first supplementary information.

A train application may not be installed in the second electronic device 1120. Also, an application of the same category as the train application may be not installed in the second electronic device 1120.

In this case, the second electronic device 1120 may display a function 1133 corresponding to the input command and information 1136 (e.g., a link) for installing a train application, and may install the corresponding application according to a user selection.

According to an embodiment, an electronic device includes a display; a wireless communication circuit; a processor operatively connected to the display and the wireless communication circuit; and a memory operatively connected to the processor, wherein the memory may store instructions that, when executed, cause the processor to obtain a command generated by an utterance input on an external device, and first data related to a function to be executed when the command is input on the external device by using the wireless communication circuit; obtain second data related to the function to be executed when the command is input on the electronic device; and determine whether the command is executable on the electronic device based on a result of a comparison between the first data and the second data.

The instructions may be configured to cause the processor to further obtain first supplementary information related to the external device by using the wireless communication circuit.

The instructions may be configured to cause the processor to transmit the command and second supplementary information related to the electronic device to a first external server by using the wireless communication circuit, and obtain the second data generated based on the command and the second supplementary information from the first external server.

The first data may be generated by the first external server that processes the command and the first supplementary information received from the external device.

The instructions may be configured to cause the processor to obtain the command and the first data from a second external server by using the wireless communication circuit.

The instructions may be configured to cause the processor to map the command to the first data and/or second data and store the mapping result in the memory if the first data and the second data are the same.

The instructions may be configured to cause the processor to change at least one of the command or the second data if the first data and the second data are different.

The instructions may be configured to cause the processor to change at least one of the command or the second data based on second supplementary information related to the electronic device.

The instructions may be configured to cause the processor to change at least one of the command or the second data based on information stored in a first application designated to execute the command.

If a first application related to the command is not installed in the electronic device, the instructions may be configured to cause the processor to display information needed for the installation of the first application on the display or change at least a portion of the second data so that the command is executed by a second application installed in the electronic device.

If the command includes a function to be executed by a peripheral device, the instructions may be configured to cause the processor to change at least one of the command or the second data in accordance with peripheral devices connected to the electronic device.

The instructions may be configured to cause the processor to display information related to the changed at least one of the command or the second data on the display, and map the changed command to the second data and store the mapping result in the memory based on a user input on the display.

According to an embodiment, a command sharing method of an electronic device includes obtaining a command generated by an utterance input on an external device, and first data related to a function to be executed when the command is input on the external device; obtaining second data related to a function to be executed when the command is input on the electronic device; and determining whether the command is executable on the electronic device based on a result of a comparison between the first data and the second data.

The command sharing method may further include obtaining first supplementary information related to the external device.

Obtaining the second data may include transmitting the command and second supplementary information related to the electronic device to a first external server; and obtaining the second data generated based on the command and the second supplementary information from the first external server.

If the first data and the second data are the same, the command sharing method may further include mapping the command to the first data and/or second data and storing the mapping result.

If the first data and the second data are different, the command sharing method may further include changing at least one of the command or the second data.

Changing at least one of the command or the second data may include changing at least one of the command or the second data based on second supplementary information related to the electronic device.

Changing at least one of the command or the second data may include changing at least one of the command or the second data based on information stored in a first application designated to execute the command.

If a first application related to the command is not installed in the electronic device, changing at least one of the command or the second data may include at least one of displaying information needed for the installation of the first application on the display 76yu8or changing at least a portion of the second data so that the command is executed by a second application installed in the electronic device.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
a display;
a wireless communication circuit;
a processor operatively connected to the display and the wireless communication circuit; and
a memory operatively connected to the processor,
wherein the memory stores instructions that, when executed, cause the processor to:
obtain a command generated by an utterance input on an external device, and first data related to a function to be executed when the command is input on the external device by using the wireless communication circuit;
obtain second data related to the function to be executed when the command is input on the electronic device; and
determine whether the command is executable on the electronic device based on a result of a comparison between the first data and the second data, and
wherein the instructions are further configured to cause the processor to map the command to at least one of the first data or the second data and store a mapping result in the memory in case that the first data and the second data are the same.

2. The electronic device of claim 1, wherein the instructions are further configured to cause the processor to obtain first supplementary information related to the external device by using the wireless communication circuit.

3. The electronic device of claim 1, wherein the instructions are further configured to cause the processor to:
transmit the command and second supplementary information related to the electronic device to a first external server by using the wireless communication circuit; and
obtain the second data generated based on the command and the second supplementary information from the first external server.

4. The electronic device of claim 3, wherein the first data is generated by the first external server that processes the command and the first supplementary information received from the external device.

5. The electronic device of claim 1, wherein the instructions are further configured to cause the processor to obtain the command and the first data from a second external server by using the wireless communication circuit.

6. The electronic device of claim 1, wherein the instructions are further configured to cause the processor to change at least one of the command or the second data in case that the first data and the second data are different.

7. The electronic device of claim 6, wherein the instructions are further configured to cause the processor to change at least one of the command or the second data based on second supplementary information related to the electronic device.

8. The electronic device of claim 7, wherein the instructions are further configured to cause the processor to change at least one of the command or the second data based on information stored in a first application designated to execute the command.

9. The electronic device of claim 7, wherein in case that a first application related to the command is not installed in the electronic device, the instructions are further configured to cause the processor to display information needed for installation of the first application on the display, or change at least a portion of the second data to permit the command to be executed by a second application installed in the electronic device.

10. The electronic device of claim 7, wherein in case that the command includes a function to be executed by a peripheral device, the instructions are further configured to cause the processor to change at least one of the command or the second data in accordance with peripheral devices connected to the electronic device.

11. The electronic device of claim 7, wherein the instructions are further configured to cause the processor to:
 display information related to the changed at least one of the command or the second data on the display; and
 map the changed command to the second data and store a mapping result in the memory based on a user input on the display.

12. A method for an electronic device to share commands, the method comprising:
 obtaining a command generated by an utterance input on an external device, and first data related to a function to be executed when the command is input on the external device;
 obtaining second data related to a function to be executed when the command is input on the electronic device,
 determining whether the command is executable on the electronic device based on a result of a comparison between the first data and the second data; and
 mapping the command to at least one of the first data or the second data and storing a mapping result in case that the first data and the second data are the same.

13. The method of claim 12, further comprising obtaining first supplementary information related to the external device.

14. The method of claim 12, wherein obtaining the second data comprises:
 transmitting the command and second supplementary information related to the electronic device to a first external server; and
 obtaining the second data generated based on the command and the second supplementary information from the first external server.

15. The method of claim 12, further comprising changing at least one of the command or the second data in case that the first data and the second data are different.

16. The method of claim 15, wherein changing at least one of the command or the second data comprises changing at least one of the command or the second data based on second supplementary information related to the electronic device.

17. The method of claim 16, wherein changing at least one of the command or the second data comprises changing at least one of the command or the second data based on information stored in a first application designated to execute the command.

18. The method of claim 16, wherein changing at least one of the command or the second data comprises at least one of, in case that a first application related to the command is not installed in the electronic device:
 displaying information needed for installation of the first application on a display; or
 changing at least a portion of the second data to permit the command to be executed by a second application installed in the electronic device.

* * * * *